United States Patent [19]

McCormick

[11] Patent Number: 4,560,355

[45] Date of Patent: Dec. 24, 1985

[54] MARINE DRIVE THREAD MOUNTED PINION

[75] Inventor: Daniel F. McCormick, Oshkosh, Wis.

[73] Assignee: Brunswick Corporation, Skokie, Ill.

[21] Appl. No.: 566,492

[22] Filed: Dec. 29, 1983

[51] Int. Cl.$^4$ .......................................... B63H 23/08
[52] U.S. Cl. ................................ 440/86; 192/48.92; 192/48.9; 74/372; 74/DIG. 8
[58] Field of Search ................... 440/75, 86; 192/3.51, 192/3.54, 71, 21, 51, 48.1, 48.9, 48.91, 48.92; 74/417, 372, DIG. 8

[56] References Cited

U.S. PATENT DOCUMENTS

| | | | |
|---|---|---|---|
| 2,630,775 | 3/1953 | Kiekhaefer | 440/75 |
| 2,959,986 | 11/1960 | Irgens et al. | 74/792 |
| 3,145,688 | 8/1964 | Kincannon | 440/86 |
| 3,256,852 | 6/1966 | Warburton | 440/86 |
| 3,556,041 | 1/1971 | Shimanckas | 440/86 |
| 3,608,684 | 9/1971 | Shimanckas | 192/20 |
| 3,931,783 | 1/1976 | Croisant | 440/75 |
| 4,223,773 | 9/1980 | Croisant et al. | 192/48.91 |
| 4,258,642 | 3/1981 | Burmeister | 440/53 |
| 4,262,622 | 4/1981 | Dretzka | 440/86 |
| 4,302,196 | 11/1981 | Blanchard | 440/75 |
| 4,318,702 | 3/1982 | Stacey | 440/86 |
| 4,323,356 | 4/1982 | Stephenson | 440/86 |
| 4,395,240 | 7/1983 | Blanchard | 440/86 |

FOREIGN PATENT DOCUMENTS 654501 6/1951 United Kingdom .
709643 6/1954 United Kingdom .

OTHER PUBLICATIONS

"Helicopter Freewheel Unit Design Guide", Sikorsky Aircraft, Div. of United Technologies Corp., N. Main St., Stratford, Conn., U.S. Army Air Mobility Research and Development Laboratories, Fort Eustis, Va., USAAMRDL-TR-77-18, Oct. 1977, pp. 14, 16, 56.
"OMC Marine Drive Systems", Outboard Marine Corp., Waukegan, Ill., 1981, pp. 6-7.

Primary Examiner—Galen L. Barefoot
Assistant Examiner—C. T. Bartz
Attorney, Agent, or Firm—Andrus, Sceales, Starke & Sawall

[57] ABSTRACT

Threaded pinion drive gear apparatus (2) for a marine drive lower gear case (4) includes a pinion gear (12) thread mounted at the bottom end of a vertical drive shaft (10) for driving rotatable driven gears (14 and 16) which drive a propeller shaft (6).

8 Claims, 1 Drawing Figure

MARINE DRIVE THREAD MOUNTED PINION

TECHNICAL FIELD

The invention relates to the pinion drive gear for a marine drive lower gear case.

BACKGROUND

In a marine drive lower gear case, a beveled pinion drive gear is typically bolted to the bottom of a splined drive shaft, for example as shown in Croisant U.S. Pat. No. 3,931,783, and Croisant et al. U.S. Pat. No. 4,223,773.

DISCLOSURE OF INVENTION

A pinion gear is thread mounted at the bottom end of a drive shaft and drives a propeller shaft in a marine drive lower gear case. A clutch engaged loading force is applied in a direction upwardly along the axis of the drive shaft to bias the pinion gear to a thread tightened condition. Advantages include increased stiffness against bending of the drive shaft because of the larger diameter facilitated, and reduced cost in manufacture.

BEST MODE FOR CARRYING OUT THE INVENTION

Figure 1:
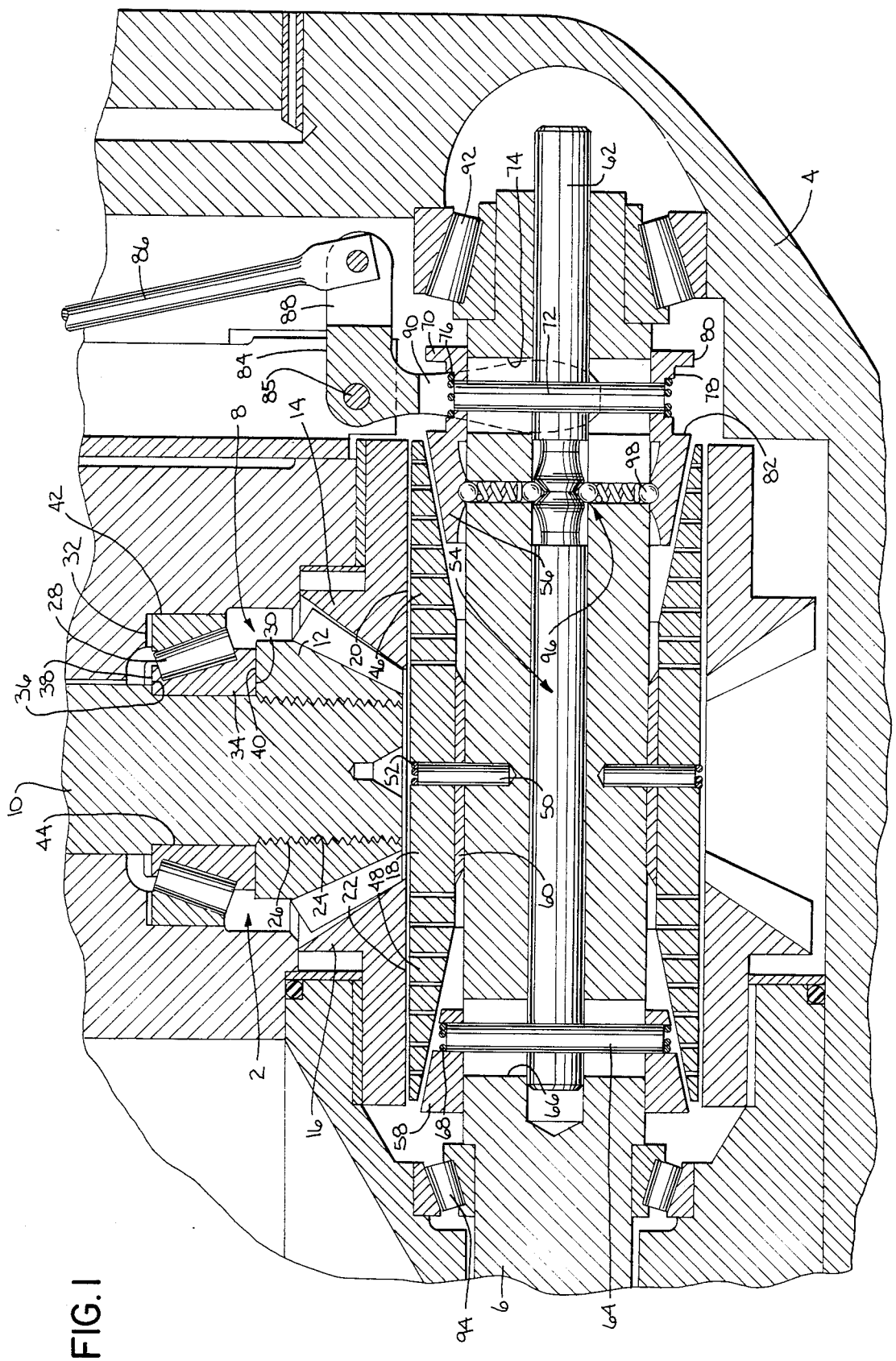
FIG. 1 is a schematic partial sectional view of thread mounted pinion drive gear apparatus for a marine drive lower gear case constructed in accordance with the invention.

Threaded pinion drive gear apparatus 2 for a marine drive lower gear case 4 includes a propeller shaft 6 rotatably mounted in the gear case for producing axial thrust for marine propulsion, for which further reference may be had to said Croisant et al. U.S. Pat. No. 4,223,773, Croisant U.S. Pat. No. 3,931,783 and Kiekhaefer U.S. Pat. No. 2,630,775. Drive gear means 8 drives the propeller shaft. A drive shaft 10 extends vertically downwardly into the gear case and is rotatable about a vertical axis substantially orthogonal to propeller shaft 6. A beveled drive or pinion gear 12 is thread mounted at the bottom end of the drive shaft and drives rotatable driven gear means concentric with the propeller shaft to drive the latter. Gears 14 and 16 are engaged by pinion gear 12 and driven in opposite rotating directions concentrically about propeller shaft 6, for providing left hand rotation or right hand rotation, for forward or reverse direction.

Clutch means 18 is connected to propeller shaft 6 and movable radially away therefrom to engage the inner facing concentric surfaces 20 and 22 of driven gears 14 and 16 in a direction applying loading force upwarding along the axis of drive shaft 10 to bias pinion gear 12 to a thread tightened condition. The bottom of drive shaft 10 is threaded about its outer periphery 24 to mate with concentric inner threads 26 of pinion gear 12.

One or more bearings support drive shaft 10 and carry radial and axial loads. One bearing such as a sleeve, a needle bearing or ball bearing may carry the radial load, and a second separate bearing may carry the axial load. In preferred form a single thrust bearing carries both loads. Thrust bearing means 28 is mounted between an upper shoulder 30 on pinion gear 12 and a seat 32 in the gear case adjacent drive shaft 10. Thrust bearings 28 are tapered roller bearings having an inner race 34 with an upper end 36 engaging a downwardly facing seat 38 in drive shaft 10, and with a lower end 40 engaging the top 30 of pinion gear 12. The tapered roller bearing has an outer race 42 engaging downwardly facing seat 32 in the gear case. Drive shaft 10 has one or more step reductions in diameter at its lower end. The first stepped reduced diameter section 44 carries inner race 34 of tapered roller bearing thrust means 28. The second step further reduced diameter section 24 is threaded and engaged by thread mounted pinion gear 12.

Clutch 18 is a wrapped spring clutch, as shown in "Helicopter Freewheel Unit Design Guide", Sikorsky Aircraft, Division of United Technologies Corp., North Main St., Stratford, Conn., U.S. Army Air Mobility Research and Development Laboratories, Fort Eustis, Va., USAAMRDL-TR-77-18, Oct. 1977, especially pages 14, 16 and 56, and for further reference Irgens et al. U.S. Pat. No. 2,959,986 and Schimanckas U.S. Pat. No. 3,608,684. A first clutch face portion 46 is radially aligned between propeller shaft 6 and first driven gear 14 and radially movable outwardly away from the propeller shaft to engage the concentric inner facing surface 20 of gear 14. Second clutch face portion 48 is radially aligned between propeller shaft 6 and second driven gear 16 and radially movable outwardly away from the propeller shaft to engage the concentric inner facing surface 22 of gear 16. Clutch 18 at its central portion is mounted to propeller shaft 6 by splines 60 and radial pins 50 retained in an annular recessed groove by a coil spring 52, like that shown in said Croisant et al. U.S. Pat. No. 4,223,773.

Control means 54 is axially movable along the propeller shaft between first and second, left and right positions for driving propeller shaft 6 in opposite directions of rotation. In the first leftward position, control means 54 cams first clutch face portion 46 at cam 56 into engagement with first driven gear 14 to drive propeller shaft 6 in one direction of rotation. In the second, rightward position, control means 54 cams second clutch face portion 48 at cam 58 into engagement with second driven gear 16 to drive propeller shaft 6 in the opposite direction of rotation. Clutch 18 is fixed for rotation on shaft 6 by pins 50 and splines 60, and is fixed against axial movement along shaft 6 by pins 50.

Control means 54 includes an inner axial control shaft 62 axially slideable within propeller shaft 6. Left cam 58 is connected to inner control shaft 62 by radial pin 64 extending through opening 66 in the propeller shaft and retained in an annular recessed groove in cam 58 by coil spring 68. Cam 56 includes a coupler 70 which is connected to inner control shaft 62 by radial pin 72 extending through opening 74 in the propeller shaft and retained in an annular recessed groove in coupler 70 by coil spring 76. Coupler 70 is a spool-like portion having a central section 78 between larger diametered end sections 80 and 82.

Operator controlled shift linkage 84 is operatively connected to coupler 70 to move inner control shaft 62 axially rightward or leftward within the propeller shaft. An operator controlled stalk 86 extends downwardly into the gear case and is connected at its bottom end to a clevis lever arm 88 of a bell crank 84 pivoted at point 85. The bell crank has a second forked lever arm 90 with spaced tines loosely engaging coupler 70 around central section 78 between ends 80 and 82 to allow coupler 70 and inner control shaft 62 to spin between the tines when the propeller shaft is driven.

Operator actuated downward movement of stalk 86 moves lever arm 88 downwardly which pivots bell crank 84 clockwise about pivot point 85 which moves lever arm 90 leftwardly. Lever arm 90 engages section 82 of coupler 70 to move coupler 70 and cam 56 axially leftwardly along propeller shaft 6, such that cam 56 engages clutch face portion 46 to press the latter into engagement with gear 14 along friction face engagement surface 20 to impart the rotation of gear 14 to propeller shaft 6 through the clutch. Leftward axial movement of coupler 70 also moves pin 72 leftwardly in opening 74 which moves inner control shaft 62 leftwardly which moves pin 64 leftwardly in opening 66 which in turn moves cam 58 axially leftwardly away from clutch face 48 to thus prevent biased engagement of the latter against gear 16 at surface 22. Rightward movement of control means 54 is comparable in response to upward movement of stalk 86.

Tapered roller bearings 92 carry the axial thrust of propeller shaft in one direction, and tapered roller bearings 94 carry the thrust in the outer axial direction. Centering detent means 96 provides a tactile neutral position and includes resilient means extending radially through slots in the propeller shaft between inner control shaft 62 and cam 56, with spring biased balls 98 in respective annular grooves in shaft 62 and cam 56, radially compressed during axial left-right movement of inner control shaft 62.

I claim:

1. Threaded pinion drive gear apparatus for a marine drive lower gear case, comprising:
   a propeller shaft rotatably mounted in said lower gear case;
   drive gear means in said lower gear case for driving said propeller shaft, and including:
   a drive shaft extending downwardly into said lower gear case and rotatable about an axis substantially orthogonal to said propeller shaft;
   a pinion gear internally threaded, thread mounted at the bottom end of said drive shaft, said drive shaft being externally threaded;
   rotatable driven gear means concentric with said propeller shaft and driven by said pinion gear to drive said propeller shaft; and
   overrunning clutch means connected to said propeller shaft and movable to engage said driven gear means to apply loading force to bias said pinion gear to a thread tightened condition and prevent unscrewing of said pinion gear from said drive shaft.

2. The invention according to claim 1 wherein said clutch means has a cylindrical clutch face extending axially along the axis of said propeller shaft and radially expandable into engagement with an inner concentric facing surface of said driven gear means to apply loading force radially.

3. The invention according to claim 2 comprising bearing means in said gear case supporting said drive shaft.

4. The invention according to claim 3 wherein said bearing means comprises thrust bearing means carrying loads along the axis of said drive shaft and mounted between an upper shoulder on said pinion gear and a seat in said gear case adjacent said drive shaft.

5. The invention according to claim 4 wherein said thrust bearing means comprises:
   tapered roller bearing means having:
   an inner race with:
   an upper end engaging a downwardly facing seat in said drive shaft and
   a lower end engaging the top of said pinion gear; and
   an outer race having an upper end engaging a downwardly facing seat in said gear case.

6. The invention according to claim 5 wherein said drive shaft has double stepped reductions in diameter at its lower end,
   the first step reduced diameter section carrying said inner race of said tapered roller thrust bearing means, and
   the second step further reduced diameter section being threaded and engaged by said thread mounted pinion gear.

7. Threaded pinion drive gear apparatus for a marine drive lower gear case, comprising:
   a propeller shaft rotatably mounted in said lower gear case;
   drive means in said lower gear case for driving said propeller shaft, and including:
   a drive shaft extending downwardly into said lower gear case and rotatable about an axis substantially orthogonal to said propeller shaft;
   a pinion gear internally threaded, thread mounted at the bottom end of said drive shaft, said drive shaft being externally threaded;
   rotatable driven gear means comprising a pair of driven gears concentric with and axially spaced along said propeller shaft and oppositely driven by said pinion gear;
   overrunning clutch means having a central section fixed on said propeller shaft and radially aligned with said pinion gear, and having distal first and second end sections on opposite axial sides of said central section;
   said first end section of said clutch means includes a first clutch face portion radially aligned between said propeller shaft and the first driven gear of said pair and radially movable outwardly away from said propeller shaft to engage the concentric inner facing surface of said first driven gear of said pair in a direction applying loading force radially;
   said second end section of said clutch means includes a second clutch face portion radially aligned between said propeller shaft and the second driven gear of said pair and radially movable outwardly away from said propeller shaft to engage the concentric inner facing surface of said second driven gear in a direction applying loading force radially.

8. The invention according to claim 7 comprising control means axially movable along said propeller shaft between first and second positions for axially moving first and second cams along said propeller shaft into respective first and second positions engaging the undersides of respective said first and seecond ends of said clutch means, said first and second cams being radially aligned between said propeller shaft and respective said first and second ends of said clutch means and axially movable relative thereto, said first position of said control means comming said first clutch face portion into engagement with said first driven gear to drive said propeller shaft in one direction of rotation, said second position of said control means camming said second clutch face portion into engagement with said second driven gear to drive said propeller shaft in the opposite direction of rotation.

* * * * *

UNITED STATES PATENT AND TRADEMARK OFFICE
CERTIFICATE OF CORRECTION

PATENT NO. : 4,560,355
DATED      : December 24, 1985
INVENTOR(S) : DANIEL F. MCCORMICK It is certified that error appears in the above-identified patent and that said Letters Patent is hereby corrected as shown below:

In column 1, line 54, delete "upwarding" and insert --upwardly--

In column 3, line 21, delete "outer" and insert --other--

In claim 8, column 4, line 56, delete "seecond" and insert --second--

In claim 8, column 4, line 61, delete "comming" and insert --camming--

Signed and Sealed this

First Day of July 1986

[SEAL]

Attest:

DONALD J. QUIGG

Attesting Officer

Commissioner of Patents and Trademarks